(12) United States Patent
Shields et al.

(10) Patent No.: US 9,844,301 B2
(45) Date of Patent: Dec. 19, 2017

(54) COVER FOR HOLDING TRAY

(71) Applicant: Henny Penny Corporation, Eaton, OH (US)

(72) Inventors: Michael Shields, Eaton, OH (US); Bradley Loase, Eaton, OH (US)

(73) Assignee: Henry Penny Corporation, Eaton, OH (US)

( * ) Notice: Subject to any disclaimer, the term of this patent is extended or adjusted under 35 U.S.C. 154(b) by 487 days.

(21) Appl. No.: 14/089,748

(22) Filed: Nov. 25, 2013

(65) Prior Publication Data
US 2015/0144635 A1    May 28, 2015

(51) Int. Cl.
| | |
|---|---|
| *A47G 19/00* | (2006.01) |
| *B65D 21/02* | (2006.01) |
| *B65D 23/00* | (2006.01) |
| *B65D 51/24* | (2006.01) |
| *A47J 39/00* | (2006.01) |
| *A47J 36/06* | (2006.01) |
| *F24C 15/16* | (2006.01) |

(52) U.S. Cl.
CPC .............. *A47J 39/006* (2013.01); *A47J 36/06* (2013.01)

(58) Field of Classification Search
CPC ......... A47J 39/006; A47J 36/06; F24C 15/16; B65D 23/003; B65D 51/242; B65D 2501/24942
USPC ...................................................... 220/23.83
See application file for complete search history.

(56) References Cited

U.S. PATENT DOCUMENTS

| | | |
|---|---|---|
| 3,267,924 A | 8/1966 | Payne |
| 6,541,739 B2 | 4/2003 | Shei et al. |
| 7,328,654 B2 * | 2/2008 | Shei ...................... A47J 39/006 219/385 |
| 8,404,292 B2 | 3/2013 | Veltrop et al. |

(Continued)

FOREIGN PATENT DOCUMENTS

| | | | |
|---|---|---|---|
| WO | WO 9733814 A1 * | 9/1997 | .......... B65D 51/242 |
| WO | 2014004291 A1 | 1/2014 | |

OTHER PUBLICATIONS

International Searching Authority, International Search Report and Written Opinion in counterpart International Application No. PCT/US2014/067334, dated Mar. 3, 2015.

(Continued)

*Primary Examiner* — Andrew T Kirsch
(74) *Attorney, Agent, or Firm* — Wood Herron & Evans LLP

(57) ABSTRACT

A holding apparatus comprises a tray configured to hold food product therein, a holding portion configured to hold the tray therein, and a cover configured to cover the tray held in the holding portion. The cover comprises a covering portion, a pair of flange portions, the covering portion being disposed between the pair of flange portions, and a channel formed in each of the flange portions. The channel comprises a first portion extending from an edge of each of the flange portions, a supporting portion, and a second portion formed between the first portion and the supporting portion. The holding apparatus further comprises a projecting portion disposed on the holding apparatus and configured to be coupled to the channel such that the cover is suspended in the holding portion via contact between the projecting portion and the supporting portion of the channel.

17 Claims, 6 Drawing Sheets

(56) References Cited

U.S. PATENT DOCUMENTS

2006/0185527 A1    8/2006   Shei
2007/0108178 A1    5/2007   Jones
2012/0076903 A1    3/2012   Maciejewski et al.
2014/0010937 A1    1/2014   Stanger

OTHER PUBLICATIONS

European Searching Authority, Search Report issued in corresponding EP Application No. 14 86 3498, dated Aug. 14, 2017, 9 pages.

* cited by examiner

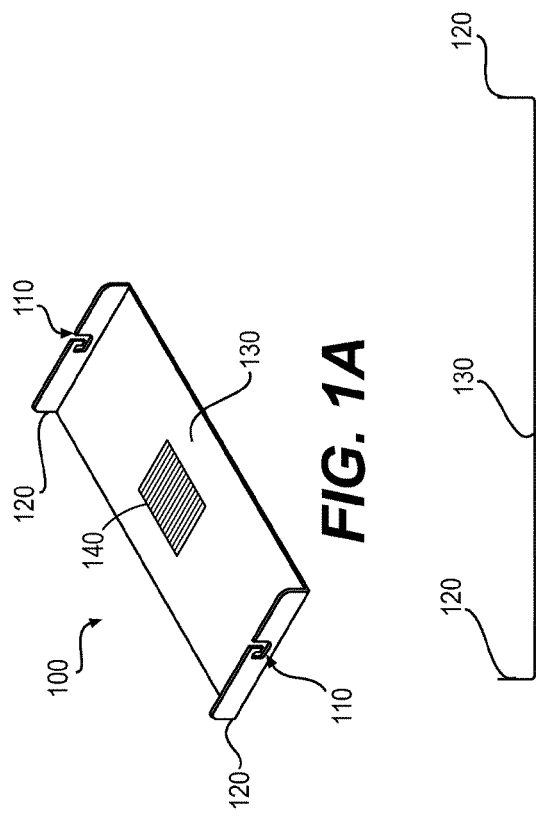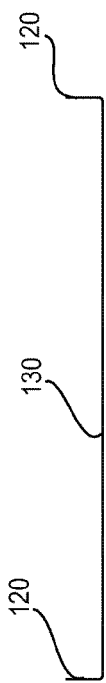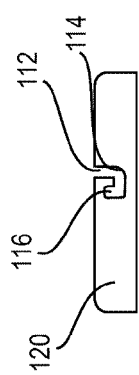

COVER FOR HOLDING TRAY

BACKGROUND OF THE INVENTION

1. Field of the Invention

The invention relates generally to a tray cover of a heated holding cabinet drawer for holding a food product therein, and holding apparatus including such tray cover.

2. Description of Related Art

After cooking various the food products, e.g., poultry, fish, potato products, and the like, such food product may be placed in a holding tray inside a heated cabinet. The tray is covered by a tray cover to contain moisture inside the holding tray that holds the cooked food product in the heated cabinet. For non-breaded food products in particular, moisture containment is important, to prevent the food product from drying out during a holding period in which the food product is held in the tray in the heated cabinet.

SUMMARY OF THE INVENTION

Therefore, a need has arisen for covers for holding trays that hold food product therein, which overcome these and other shortcomings of the related art. A tray cover according to embodiments of the invention may be configured to contain moisture inside of a holding cabinet tray that holds cooked product therein, thereby reducing food waste and improving food quality.

In an embodiment of the invention, a holding apparatus comprises a tray configured to hold food product therein, a holding portion configured to hold the tray therein, and a cover configured to cover the tray held in the holding portion. The cover comprises a covering portion, a pair of flange portions, the covering portion being disposed between the pair of flange portions, and a channel formed in each of the flange portions. The channel comprises a first portion extending from an edge of each of the flange portions, a supporting portion, and a second portion formed between the first portion and the supporting portion. The holding apparatus further comprises a projecting portion disposed on the holding apparatus and configured to be coupled to the channel such that the cover is suspended in the holding portion via contact between the projecting portion and the supporting portion of the channel.

In another embodiment of the invention, a cover is configured to cover a tray configured to hold food product therein that is held in a holding portion of a holding apparatus. The cover comprises a covering portion, a pair of flange portions, the covering portion being disposed between the pair of flange portions, and a channel formed in each of the flange portions. The channel comprises a first portion extending from an edge of each of the flange portions, a supporting portion, and a second portion formed between the first portion and the supporting portion. The channel is configured to be coupled to a projecting portion disposed on the holding apparatus such that the cover is suspended in the holding portion via contact between the projecting portion and the supporting portion of the channel.

One advantage of the tray cover is that it is a one piece design that is easily removable without tools. Another advantage is that it allows a tray to be covered inside the holding unit and slid in and out of the holding cavity to expose access to food without any user interaction. A further advantage of the tray cover is that it is easier to clean the cover due to the ease of its removal, and the cover can be washed by hand or inside of a dish washer.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

FIG. 1A is a perspective view of a tray cover, according to an embodiment of the invention.

FIG. 1B is a front side view of a tray cover, according to an embodiment of the invention.

FIG. 1C is a side elevational view of a tray cover, according to an embodiment of the invention.

DETAILED DESCRIPTION OF EMBODIMENTS OF THE INVENTION

Figure 2:
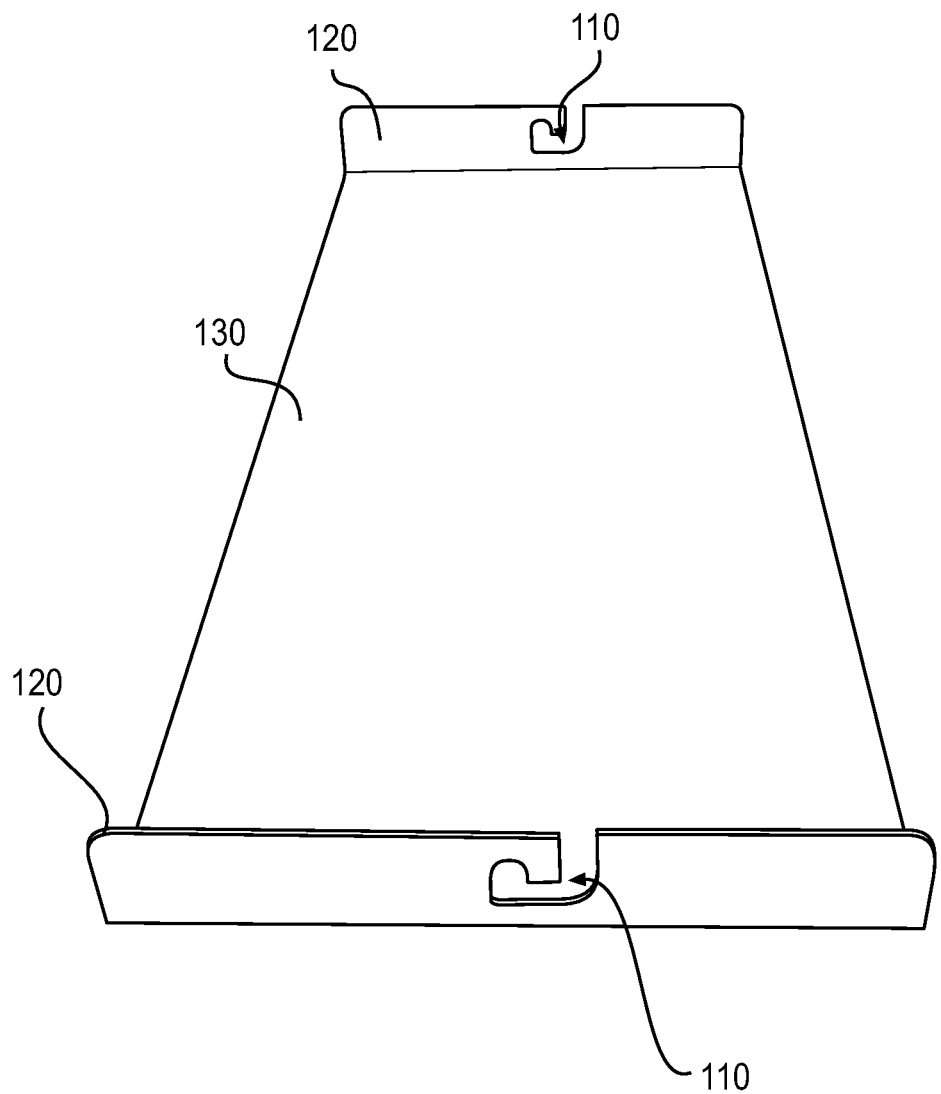
FIG. 2 is a front perspective of a tray cover, according to an embodiment of the invention.

Embodiments of the present invention, and their features and advantages, may be understood by referring to FIGS. 1-6, like numerals being used for corresponding parts in the various drawings.

FIG. 1A depicts a tray cover 100, according to an embodiment of the invention. Tray cover 100 may include a substantially flat covering portion 130 that is disposed between two flange portions 120. Covering portion 130 may be substantially rectangular in cross-section. As depicted in FIG. 1C, flange portions 120 may be substantially perpendicular to covering portion 130. Flange portions 120 may extend upwardly from covering portion 130. Covering portion 130 may be configured to cover a holding tray 400 (see FIG. 4). For example, the length and width of covering portion 130 corresponds to the size of holding tray 400. In alternative embodiments, tray cover 100 may have perforations formed therein as a vent 140 (shown schematically in FIG. 1A), which may allow some air communication between the inside of holding tray 400 and ambient atmosphere, such that some moisture may be allowed to escape holding tray 400, in order to regulate humidity of holding tray 400.

A channel 110 may be formed in each of the flange portions 120. As depicted in FIG. 1B, channel 110 may have a first portion 112 that extends from the edge of the flange portions 120. First portion 112 may extend substantially vertically, for example, substantially perpendicular to the edge of flange portions 120. A second portion 114 may extend from first portion 112 and may join a supporting portion 116, such that second portion 114 is disposed between first portion 112 and supporting portion 116. Second portion 114 may extend substantially horizontally. Supporting portion 116 may be substantially parallel to first portion 112. Supporting portion 116 may be substantially perpendicular to second portion 114. Second portion 114 may meet first portion 112 with a curved portion formed therebetween. Supporting portion 116 may meet second portion 114 with a corner formed therebetween. Alternatively, the curved portion may be a corner and/or the corner may be a curved portion. Thus, channel 110 may be substantially J-shaped or substantially U-shaped. Supporting portion 116 may be disposed at substantially the center of tray cover 100 in the width direction.

FIG. 2 depicts a front view of tray cover 100, according to an embodiment of the invention. Tray cover 100 may be a unitary piece with flange portions 120 bent upward from covering portion 130. Alternatively, flange portions 120 may be formed separately from covering portion 130.

Figure 3:
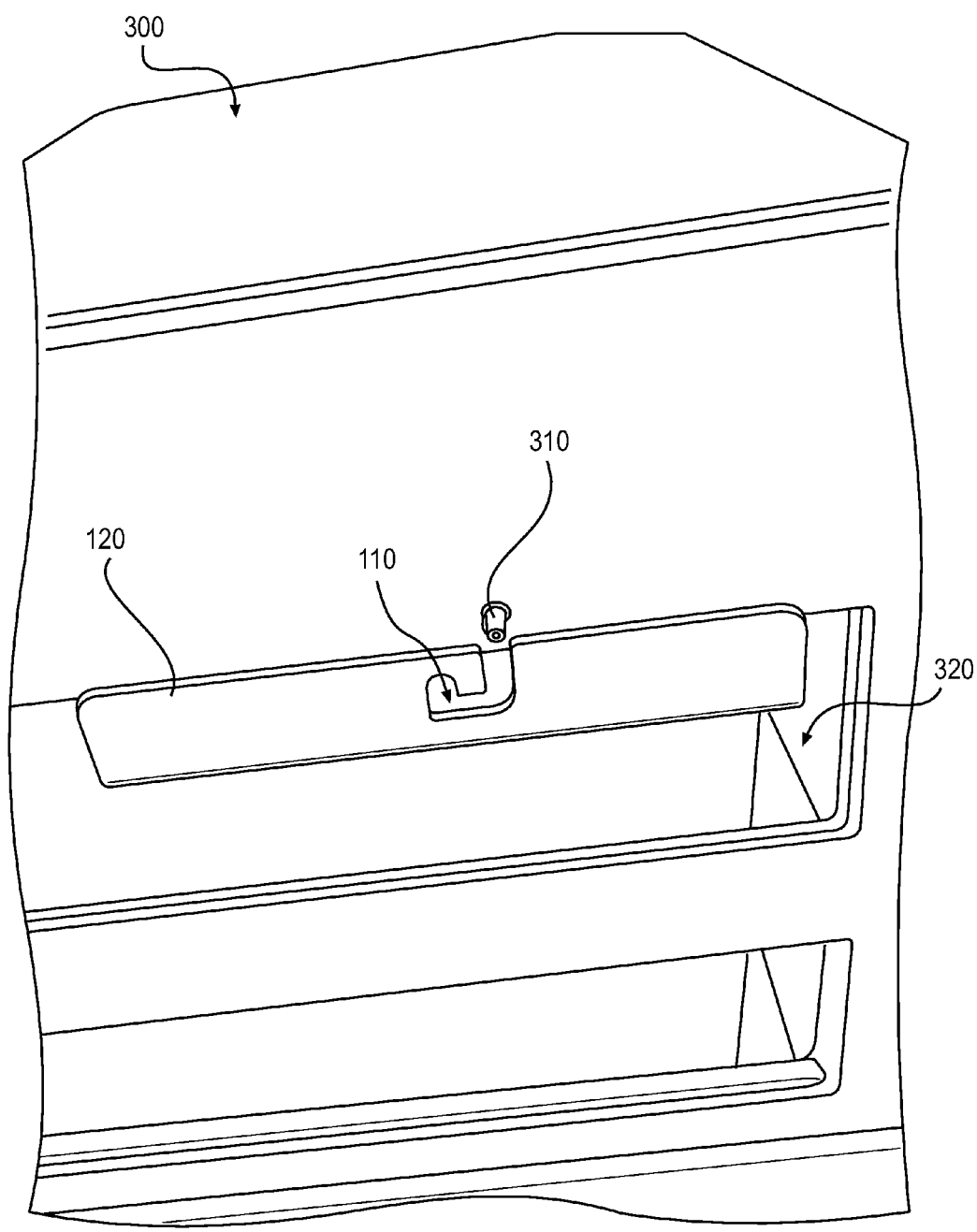
FIG. 3 is a front view of a tray cover being installed in a holding apparatus, according to an embodiment of the invention.

FIG. 3 depicts a front view of tray cover 100 being installed in a holding apparatus 300, according to an embodiment of the invention. A projecting portion 310 may be disposed on a surface of holding apparatus 300, above a cabinet portion 320. Projecting portion 310 may be a pin, a knob, a peg, a cylinder, or the like, that is fixed to a surface of holding apparatus 300 or formed integrally with the surface. The width of channel 110 may correspond to the width of projecting portion 310. Tray cover 100 may be installed in cabinet portion 320 by inserting tray cover 100 such that projecting portion 310 is coupled to channel 110 by entering first portion 112 of channel 110. Tray cover 100 may continue to be moved, such that projecting portion 310 moves along channel 110, from first portion 112 to second portion 114, and then to supporting portion 116.

Figure 4:
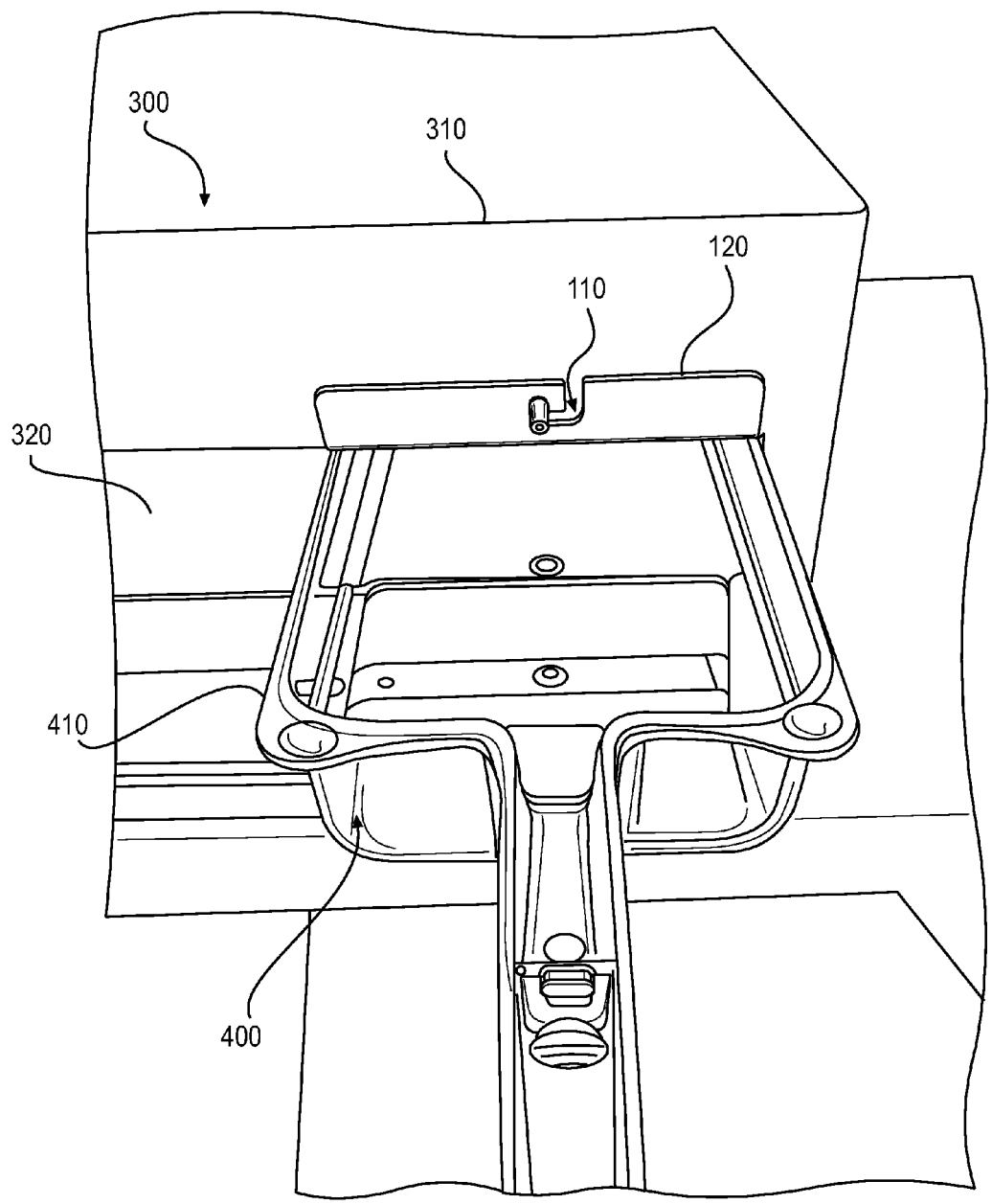
FIG. 4 is a front view of a tray cover installed in a holding apparatus with a tray partially removed from a holding cabinet of a holding apparatus, according to an embodiment of the invention.

For example, tray cover 100 may be moved substantially vertically upward such that projecting portion 310 enters channel 110 via first portion 112. Tray cover 100 may then be moved substantially horizontally such that projecting portion 310 moves along second portion 114 of channel 110. Tray cover 100 may be set and held in place, as projecting portion 310 moves into supporting portion 116 of channel 110 via substantially vertical movement of tray cover 100. When tray cover 100 is installed, as depicted in FIG. 4, projecting portion 310 may contact a supporting edge of supporting portion 116 such that supporting portion 116 supports tray cover 100 in place via projecting portion 310. The supporting edge may be shaped to correspond to the shape of projection portion 310. Projecting portion 310 may be disposed on each of front and back walls of holding apparatus 300, to correspond to channels 110 formed in each of flange portions 120.

As depicted in FIG. 4, holding tray 400 may be inserted in cabinet portion 320 below tray cover 100. Holding tray 400 may be slidably installed in cabinet portion 320. Holding tray 400 may have a lip or rim forming an edge 410 along the upper perimeter of holding tray 400. As holding tray 400 is installed, edge 410 may make sliding contact with tray cover 100. Alternatively, edge 410 may be slightly separated from tray cover 100 such that a small gap is formed therebetween. In alternative embodiments, tray cover 100 may have grooves that engage with edge 410 of holding tray 400. In other alternative embodiments, tray cover 100 may have substantially vertical flanges that extend downward from the side edge of tray cover 100 to engage with or be disposed adjacent to edge 410 of holding tray 400.

Figure 5:
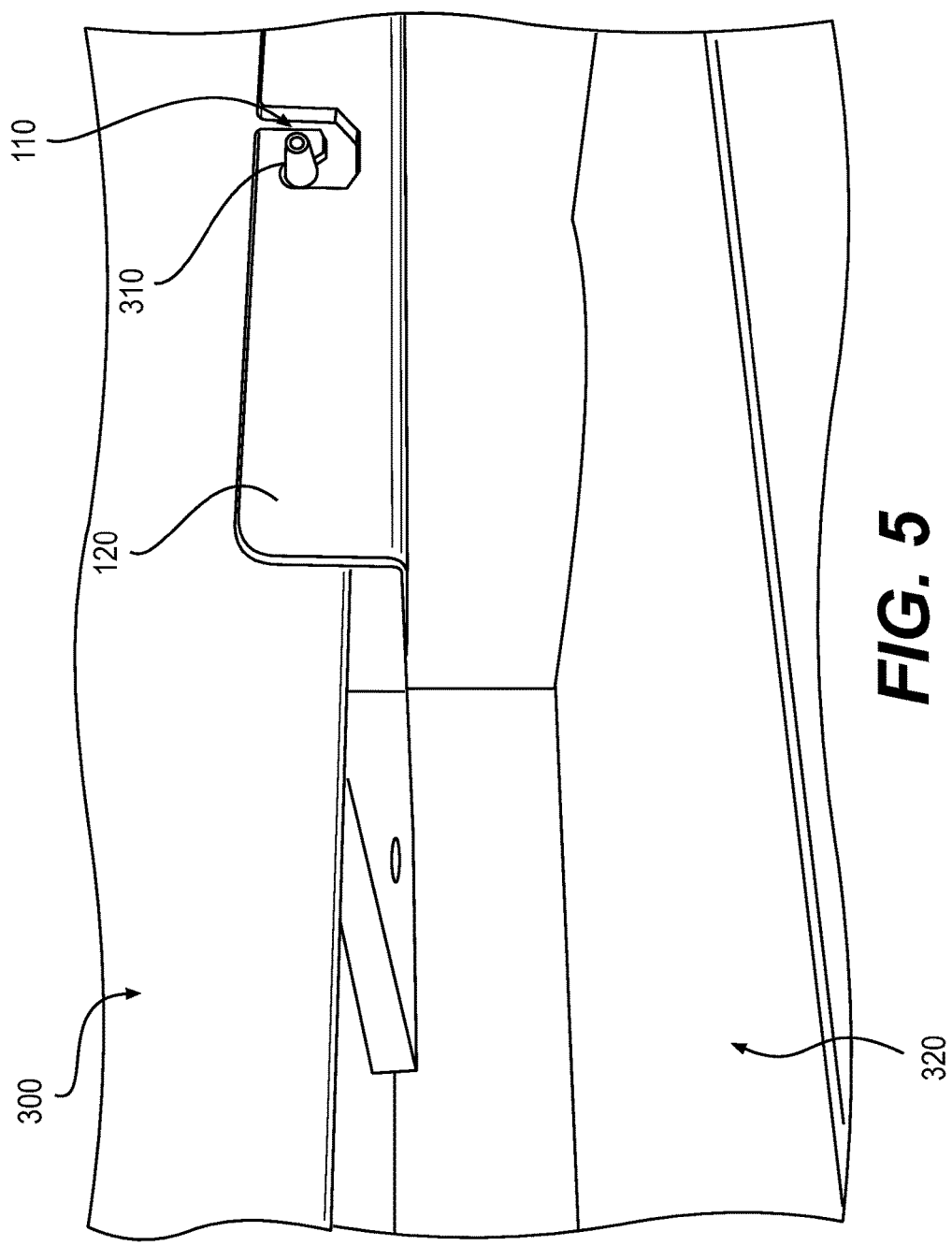
FIG. 5 is a perspective view of a tray cover installed in a holding apparatus, according to an embodiment of the invention.

FIG. 5 depicts a perspective view of tray cover 100 installed in cabinet portion 320, according to an embodiment of the invention. When installed, tray cover 100 may be suspended in cabinet portion 320 via projecting portions 310 contacting supporting portions 116 of channels 110 formed in flange portions 120. Tray cover 100 may rest in place with projecting portions 310 in contact with supporting portions 116 via gravity, such that tray cover 100 is thereby hanging on holding apparatus 300 via projecting portions 310 disposed on front and rear faces of holding apparatus 300. Thus, tray cover 100 may be disposed in an upper portion of cabinet portion 320 with a space below tray cover 100 for holding tray 400 to be inserted. In addition, flange portions 120 may be adjacent to the surfaces of holding apparatus 300 on which projecting portions 310 are disposed.

Figure 6:
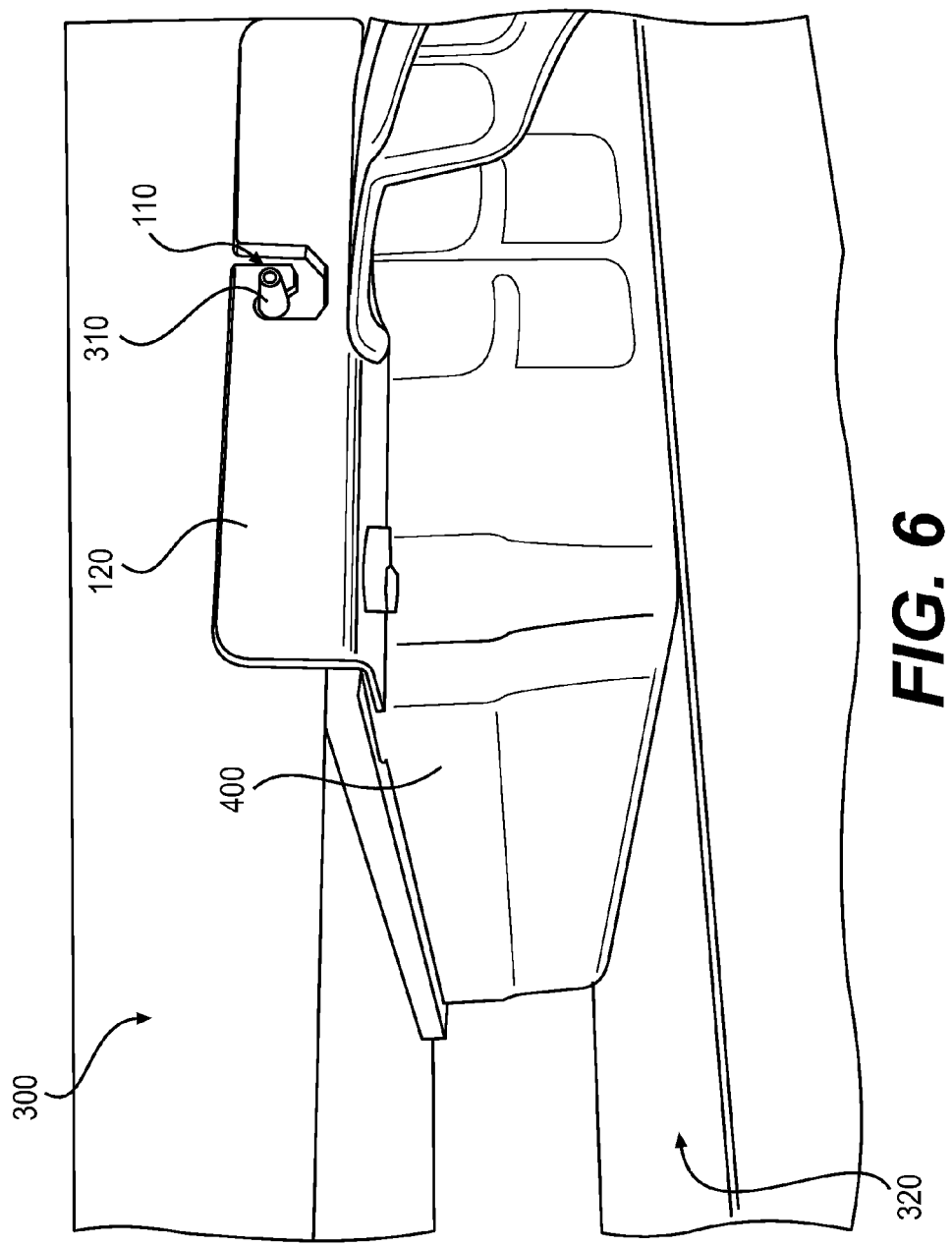
FIG. 6 is a perspective view of a tray cover installed in a holding apparatus with a tray also installed in the holding apparatus, according to an embodiment of the invention.

As depicted in FIG. 6, when holding tray 400 is installed in cabinet portion 320, tray cover 100 is configured to cover holding tray 400. For example, tray cover 100 may extend beyond the perimeter of holding tray 400. Edge 410 of holding tray 400 may be in contact with covering portion 130 of tray cover 100 around the entire perimeter of holding tray 400. Thus, tray cover 100 may contain moisture inside of holding tray 400 by creating a barrier between the inside of holding tray 400 and ambient atmosphere. Cabinet portion 320 may be heated and food product may be held in holding tray 400 and inserted in cabinet portion 320 for a holding period of time. Tray cover 100 may contain moisture in holding tray 400 while it is in cabinet portion 320 for the holding period, reducing the drying out of food product.

Further, tray cover 100 is configured such that holding tray 400 may be inserted and removed from cabinet portion 320 from either side, i.e., a pass-through system. Holding tray 400 may be slid in and out of cabinet portion 320 to expose access to food product held in holding tray 400 without the use of tools or additional user action. In other words, because tray cover 100 is suspended in place via projecting portions 310 and supporting portions 116 of channels 110, a user may gain access to food product held in holding tray 400 simply by sliding out holding tray 400 from cabinet portion 320, without having to remove a cover or lid. In addition, because tray cover 100 is easily attached and removed without the need for tools, tray cover 100 may be easily washed by hand or by a dishwasher.

In alternative embodiments, tray cover 100 may include a plurality of channels 110 to correspond to a plurality of projecting portions 310 from which tray cover 100 may be suspended. Further, in alternative embodiments, tray cover 100 may be formed in a variety of different shapes and sizes to correspond to different shapes and sizes of holding trays. Moreover, in alternative embodiments described above, tray cover 100 may have perforations formed therein as a vent 140 (shown schematically in FIG. 1A), which may allow some air communication between the inside of holding tray 400 and ambient atmosphere, such that some moisture may be allowed to escape holding tray 400, in order to regulate humidity of holding tray 400.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:
1. A holding apparatus comprising:
a tray configured to hold food product therein;
a holding portion configured to hold the tray therein;
a cover configured to cover the tray held in the holding portion, the cover comprising:

a covering portion;

a pair of generally planar flange portions that are aligned parallel to one another along a longitudinal direction and extend substantially from the covering portion along a transverse direction, the flange portions each having an outer surface that lies in a plane defined by the longitudinal direction and the transverse direction, wherein the covering portion is disposed between the pair of flange portions such that the flanges are separated from one another by a length of the covering portion along a lateral direction and the flange portions define opposing ends of the cover along the lateral direction; and a channel formed in each of the flange portions and extending along the plane of the outer surface of each flange, wherein the channel forms a cut region within the plane of each flange comprising a first portion extending from an edge of each of the flange portions, a supporting portion, and a second portion formed between the first portion and the supporting portion; and a projecting portion disposed on the holding apparatus and extending along the lateral direction and configured to be coupled through the channel along the lateral direction such that the cover is suspended in the holding portion via contact between the projecting portion and the supporting portion of the channel.

2. The holding apparatus of claim 1, wherein the first portion and the supporting portion are substantially vertically formed and the second portion is substantially horizontally formed joining the first portion with the supporting portion.

3. The holding apparatus of claim 1, wherein the tray comprises an edge along a perimeter of the tray.

4. The holding apparatus of claim 3, wherein the covering portion of the cover is configured to contact the edge of the tray held in the holding portion.

5. The holding apparatus of claim 1, wherein the tray is configured to be slidably inserted in the holding portion, making sliding contact with the cover.

6. The holding apparatus of claim 1, wherein a width of the channel corresponds to a size of the projecting portion.

7. The holding apparatus of claim 1, wherein the supporting portion is substantially parallel to the first portion.

8. The holding apparatus of claim 1, wherein the supporting portion is substantially perpendicular to the second portion.

9. The holding apparatus of claim 1, wherein a plurality of the projecting portions are disposed on opposing surfaces of the holding apparatus and the cover is suspended via the plurality of projecting portions in contact with the supporting portion of the channel formed in each of the flange portions, respectively.

10. The holding apparatus of claim 1, wherein the covering portion comprises a vent configured to regulate humidity of the tray covered by the covering portion.

11. A cover configured to cover a tray configured to hold food product therein that is held in a holding portion of a holding apparatus, the cover comprising:

a covering portion;

a pair of generally planar flange portions that are aligned parallel to one another along a longitudinal direction and extend substantially from the covering portion along a transverse direction, the flange portions each having an outer surface that lies in a plane defined by the longitudinal direction and the transverse direction, wherein the covering portion is disposed between the pair of flange portions such that the flanges are separated from one another by a length of the covering portion along a lateral direction and the flange portions define opposing ends of the cover along the lateral direction; and a channel formed in each of the flange portions and extending along the plane of the outer surface of each flange, wherein the channel forms a cut region within the plane of each flange comprising a first portion extending from an edge of each of the flange portions, a supporting portion, and a second portion formed between the first portion and the supporting portion, and wherein the channel is configured to be coupled to a projecting portion that is disposed on the holding apparatus and extends along the lateral direction such that the cover is suspended in the holding portion via contact between the projecting portion and the supporting portion of the channel when the projecting portion is coupled through the channel along the lateral direction.

12. The cover of claim 11, wherein the first portion and the supporting portion are substantially vertically formed and the second portion is substantially horizontally formed joining the first portion with the supporting portion.

13. The cover of claim 11, wherein the covering portion of the cover is configured to contact an edge of the tray held in the holding portion.

14. The cover of claim 11, wherein a width of the channel corresponds to a size of the projecting portion.

15. The cover of claim 11, wherein the supporting portion is substantially parallel to the first portion.

16. The cover of claim 11, wherein the supporting portion is substantially perpendicular to the second portion.

17. The cover of claim 11, wherein the covering portion comprises a vent configured to regulate humidity of the tray covered by the covering portion.

* * * * *